United States Patent
Yura et al.

(10) Patent No.: US 8,790,830 B2
(45) Date of Patent: Jul. 29, 2014

(54) POSITIVE ELECTRODE ACTIVE ELEMENT AND LITHIUM SECONDARY BATTERY

(75) Inventors: Yukinobu Yura, Nagoya (JP);
Nobuyuki Kobayashi, Nagoya (JP);
Tsutomu Nanataki, Nagoya (JP);
Kazuyuki Kaigawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 240 days.

(21) Appl. No.: 12/861,013

(22) Filed: Aug. 23, 2010

(65) Prior Publication Data

US 2011/0136011 A1  Jun. 9, 2011

Related U.S. Application Data

(63) Continuation-in-part of application No. 12/819,541, filed on Jun. 21, 2010, now abandoned.

(60) Provisional application No. 61/247,614, filed on Oct. 1, 2009.

(30) Foreign Application Priority Data

Sep. 29, 2009  (JP) ................... 2009-225125
Jun. 21, 2010  (JP) ................... 2010-140076

(51) Int. Cl.
*H01M 4/50*  (2010.01)

(52) U.S. Cl.
USPC ........................................................ 429/224

(58) Field of Classification Search
USPC ............................................... 429/121–347
See application file for complete search history.

(56) References Cited

U.S. PATENT DOCUMENTS

| | | | |
|---|---|---|---|
| 2002/0009645 A1* | 1/2002 | Shima et al. | 429/224 |
| 2002/0106566 A1 | 8/2002 | Nemoto et al. | |
| 2003/0129496 A1* | 7/2003 | Kasai et al. | 429/231.1 |
| 2005/0170250 A1 | 8/2005 | Ohzuku et al. | |
| 2006/0275664 A1 | 12/2006 | Ohzuku et al. | |

FOREIGN PATENT DOCUMENTS

| | | |
|---|---|---|
| EP | 1 487 039 A1 | 12/2004 |
| EP | 2 226 293 A1 | 9/2010 |
| JP | 2000-113889 A1 | 4/2000 |
| JP | 2003-323893 A1 | 11/2003 |
| JP | 2003-346807 A1 | 12/2003 |
| JP | 2004-292264 A1 | 10/2004 |
| JP | 2005-005208 A1 | 1/2005 |
| JP | 2007-294119 A1 | 11/2007 |
| JP | 2009-176732 A1 | 8/2009 |
| JP | 2010-192428 A1 | 9/2010 |
| WO | 03/075376 A1 | 9/2003 |
| WO | 2009/084214 A1 | 7/2009 |

OTHER PUBLICATIONS

Tsumura et al. "Lithium extraction/insertion from LiMn2O4—effect of crystallinity". Solid State Ionics 90 (1996): 197-200.*

* cited by examiner

*Primary Examiner* — Kenneth Douyette
*Assistant Examiner* — James Lee
(74) *Attorney, Agent, or Firm* — Burr & Brown, PLLC (57) ABSTRACT

A positive electrode active material containing a large number of crystal grains which contain, by 70 areal % or more, primary particles of non-octahedral shape, having particle diameters of 5 to 20 μm, and composed of lithium manganate of spinel structure containing lithium and manganese as the constituent elements.

6 Claims, 5 Drawing Sheets

POSITIVE ELECTRODE ACTIVE ELEMENT AND LITHIUM SECONDARY BATTERY

BACKGROUND OF THE INVENTION

1. Field of the Invention

The present invention relates to a positive electrode active material and a lithium secondary battery. More particularly, the present invention relates to a positive electrode active material allowing production of a lithium secondary battery superior in high-temperature cycle characteristics as well as in rate characteristics, and a lithium secondary battery superior in high-temperature cycle characteristics as well as in rate characteristics.

2. Description of Related Art

In recent years, portable electronic devices such as mobile phone, VTR, laptop PC and the like have become smaller and lighter at an accelerated pace. Lithium secondary battery is in use as an electric source of such devices. In general, lithium secondary battery has a high energy density and a high unit-cell voltage of about 4 V; therefore, it is being used not only as an electric source of portable electronic devices but also as an motor driven electric source of electric vehicle or hybrid electric vehicle.

As the positive electrode active material of lithium secondary battery, there are known lithium cobaltate of layered rock salt structure, lithium nickelate of layered rock salt structure, lithium manganate of spinel structure, etc. Lithium cobaltate of layered rock salt structure is unstable in supply because the reserve of cobalt is small and the cobalt-producing regions are unevenly distributed. Also, lithium nickelate of layered rock salt structure has a problem of unstable structure in charging condition.

Lithium manganate of spinel structure, as compared with lithium cobaltate of layered rock salt structure and lithium nickelate of layered rock salt structure, is known to be high in safety as well as rate characteristics and low in cost. The positive electrode active material using lithium manganate of spinel structure has a large internal resistance and it has been attempted to generally add conductive fine particles (e.g. acetylene black) for improvement of electrical conductivity. However, the addition of acetylene black reduces the filling amount of positive electrode active material, which has caused battery capacity decline, in some cases.

For this problem, there was disclosed, in order to reduce the resistance of positive electrode active material per se and provide a lithium secondary battery of high output and high capacity, a lithium secondary battery characterized by using a positive electrode active material which is composed mainly of Li and Mn, which has a cubic spinel structure, and whose primary particles have a nearly octahedral shape constituted mainly by flat crystal faces (see, for example, JP-A-2000-113889). In the lithium secondary battery disclosed in the JP-A-2000-113889, since the positive electrode active material is highly crystalline, the internal resistance is small and large current discharge is possible.

SUMMARY OF THE INVENTION

The lithium secondary battery disclosed in the JP-A-2000-113889, however, does not fully satisfy the high cycle characteristics required in automobiles, etc. in recent years. Further, no mention is made on the improvement on the high-temperature cycle characteristics which is ordinarily a problem in lithium manganate of spinel structure.

One reason for the capacity decline in charge-discharge cycle is said to be the dissolution of Mn ion into electrolytic solution; and a powder consisting of primary particles of large particle diameters, small in specific surface area and free from particle boundary part gives a higher cycle characteristics. Meanwhile, in large primary particles having particle diameters of 10 μm level, the surface area (in which the de-intercalation and intercalation of Li is possible) is smaller and the diffusion distance in solid of Li ion is larger; therefore, the maintenance of sufficient capacity is impossible (that is, there is a reduction in rate characteristics) in high-rate charge-discharge, in some cases.

The present invention has been made in view of the above viewpoints. The object of the present invention is to provide a positive electrode active material allowing production a lithium secondary battery which is superior in high-temperature cycle characteristics as well as in rate characteristics.

The present inventors made a study in order to achieve the above object. As a result, it was found that, by using a powder of a large number of crystal grains containing, by 70 areal % or more, primary particles of non-octahedral shape and having particle diameters of 5 to 20 μm, there can be obtained a positive electrode active material allowing production of a lithium secondary battery superior in both rate characteristics and high-temperature cycle characteristics. It was further found out that, by setting the value of the lattice strain ($\eta$) in powder X-ray diffraction pattern at $0.7 \times 10^{-3}$ or lower, the rate characteristics and the high-temperature cycle characteristics can be improved more.

According to the present invention, there are provided a positive electrode active material and a lithium secondary battery, both shown below.

[1] A positive electrode active material containing a large number of crystal grains which contain, by 70 areal % or more, primary particles of non-octahedral shape, having particle diameters of 5 to 20 μm, and composed of lithium manganate of spinel structure containing lithium and manganese as the constituent elements.

[2] The positive electrode active material according to [1], wherein the value of a lattice strain ($\eta$) in powder X-ray diffraction pattern is $0.05 \times 10^3$ to $0.7 \times 10^{-3}$.

[3] The positive electrode active material according to [1], wherein a specific surface area is 0.1 to 0.5 $m^2/g$.

[4] The positive electrode active material according to [2], wherein a specific surface area is 0.1 to 0.5 $m^2/g$.

[5] A lithium secondary battery which has an electrode body comprising a positive electrode containing a positive electrode active material according to [1] and a negative electrode containing a negative electrode active material.

[6] A lithium secondary battery which has an electrode body comprising a positive electrode containing a positive electrode active material according to [2] and a negative electrode containing a negative electrode active material.

[7] A lithium secondary battery which has an electrode body comprising a positive electrode containing a positive electrode active material according to [3] and a negative electrode containing a negative electrode active material.

[8] A lithium secondary battery which has an electrode body comprising a positive electrode containing a positive electrode active material according to [4] and a negative electrode containing a negative electrode active material.

The positive electrode active material of the present invention allows production of a lithium secondary battery which is superior in high-temperature cycle characteristics as well as in rate characteristics.

The lithium secondary battery of the present invention is superior in high-temperature cycle characteristics as well as in rate characteristics.

EXPLANATION OF NUMERICAL SYMBOLS

1, 31, 32, 33, 34, 35, 36, 37: primary particle, 2: particle boundary part, 3: crystal face, 4: battery case, 5: insulation gasket, 6: separator, 7: core, 10, 20: secondary particle, 11: a lithium secondary battery, 12: positive electrode plate, 13: negative electrode plate, 14: positive electrode layer, 15: positive electrode collector, 16: negative electrode layer, 17: negative electrode collector, 18: positive electrode side container, 19: negative electrode side container, 21: electrode body, 22: tab for positive electrode, 23: tab for negative electrode, 30: secondary particle, 40: single particle, 41 to 48: crystal grain, 50a to 50g: adhesion part (particle boundary part), 51 to 53: microparticle.

DETAILED DESCRIPTION OF THE INVENTION

The embodiment of the present invention is described below. However, the present invention is in no way restricted to the following embodiment. It should be construed that appropriate changes, improvements, etc. can be added to the following embodiment based on the ordinary knowledge possessed by those skilled in the art as long as there is no deviation from the gist of the present invention and that the resulting embodiments as well fall in the scope of the present invention.

I. Positive Electrode Active Material

The positive electrode active material of the present invention contains a large number of crystal grains which contain, by 70 areal % or more, primary particles of non-octahedral shape, having particle diameters of 5 to 20 µm, and composed of lithium manganate of spinel structure containing lithium and manganese as the constituent elements.

A lithium secondary battery using a positive electrode active material containing a large number of crystal grains which contain primary particles of non-octahedral shape, has a high rate characteristics; however, the reason therefor is uncertain. In the primary particles of lithium manganate of spinel structure, the crystal face forming an octahedron is a (111) face, which is close-packed plane of oxygen atoms. This crystal face effectively suppresses the dissolution of Mn in charge-discharge cycle but, on the other hand, is considered to suppress the intercalation and de-intercalation of Li during charge-discharge. In the primary particles of large particle diameters contained in the positive electrode active material of the present invention, the crystal face where the dissolution of Mn ion into electrolytic solution is suppressed and the intercalation and de-intercalation of Li is easy, is exposed at the particle surface; therefore, it is estimated that the rate characteristics of lithium secondary battery can be improved with no reduction in the cycle characteristics of lithium secondary battery.

The primary particles are composed of lithium manganate of spinel structure containing lithium and manganese as the constituent elements. The chemical formula of lithium manganate is ordinarily represented by $LiMn_2O_4$. In the positive electrode active material of the present invention, however, there can be used, in addition to lithium manganate of the above chemical formula, lithium manganate represented by, for example, the following general formula (I), as long as it has a spinel structure.

$$Li M_x Mn_{2-x} O_4 \quad (1)$$

In the general formula (1), M is at least one kind of element (substituting element) selected from the group consisting of Li, Fe, Ni, Mg, Zn, Al, Co, Cr, Si, Sn, P, V, Sb, Nb, Ta, Mo and W. Incidentally, the substituting element M may further include Ti, Zr and Ce together with the above-mentioned at least one kind of element. X is the substituting number of the substituting element M. Li becomes +mono-valent ion; Fe, Mn, Ni, Mg and Zn each become +bi-valent ion; B, Al, Co and Cr each become +tri-valent ion; Si, Ti, Sn, Zr and Ce each become +tetra-valent ion; P, V, Sb, Nb and Ta each become +penta-valent ion; Mo and W each become +hexa-valent ion; and all these elements are present theoretically in $\pm LiMn_2O_4$ in the form of solid solution. Incidentally, Co and Sn may take +bi-valency; Fe, Sb and Ti may take +tri-valency; Mn may take +tri- and +tetra-valencies; and Cr may take +tetra- and +hexa-valencies. Therefore, the substituting element M may be present in a state of mixed valencies. As to the oxygen, its amount need not necessarily be as shown in the above chemical formula and may be insufficient or excessive as long as the required crystal structure is maintained.

When Mn is substituted by Li (Li is excessive), the chemical formula of lithium manganate becomes $Li_{(1+x)}Mn_{(2-x)}O_4$. Incidentally, x is preferably 0.05 to 0.15. When x is smaller than 0.05, the improvement in cycle characteristics caused by the substitution of Mn by Li may be insufficient. Also, even if the value of a lattice strain ($\eta$) is small, there may be a reduction in cycle characteristics. Meanwhile, when x is larger than 0.15, the initial capacity may be small (100 mAh/g or less), which is not preferred.

When Mn is substituted by a substituting element M other than Li, the Li/Mn ratio becomes 1/(2−x), that is, Li/Mn ratio>0.5. When lithium manganate satisfying the relation of Li/Mn>0.5 is used, as compared with when lithium manganate of the chemical formula represented by $LiMn_2O_4$ is used, the crystal structure is more stabilized and, resultantly, a lithium secondary battery superior in higher-temperature cycle characteristics can be produced.

The crystal grains may be particles composed of lithium manganate (e.g. $LiNi_{0.5}Mn_{1.5}O_4$) in which 25 to 55 mol % of the total Mn is substituted by Ni, Co, Fe, Cu, Cr or the like. The positive electrode active material obtained by using such a lithium manganate allows production of a lithium secondary battery which is improved in high-temperature cycle characteristics and further has a high charge-discharge potential and a high energy density. Therefore, it allows production of a lithium secondary battery having an electromotive force of 5 V level.

The particle diameters of the primary particles are 5 to 20 µm, preferably 7 to 20 µm, more preferably 10 to 20 µm. When the particle diameters of the primary particles are not within this range, there may be a reduction in cycle characteristics. The reason therefor is uncertain but is considered to be as follows. That is, when the particle diameters are smaller than 5 µm, Mn ion dissolves into electrolytic solution easily; meanwhile, when the particle diameters are larger than 20 µm, cracks appear easily in the particles owing to the stress caused by the volume change of particles during charge-discharge, which incurs an increase in internal resistance. Incidentally, the particle diameters are a value specified as follows. First, a positive electrode active material powder is placed on a carbon tape so that there is no piling of particles; Au is sputtered thereon in a thickness of about 10 nm using an ion sputtering apparatus (JFC-1500 (trade name), a product of JEOL Ltd.); then, a secondary electron image of particles is taken, using a scanning electron microscope (JSM-6390 (trade name), a product of JEOL Ltd.), by selecting such a display magnification that 20 to 50 primary particles each having the maximum diameter of 5 µm or larger are seen in the visual field. For each primary particle in the image obtained, there is calculated an average of the maximum diameter of the particle part not hidden by other particles and the largest diameter of the diameters at right angles to the above maximum diameter, and the average is taken as the particle diameter (µm) of the primary particle. In this way, particle diameters are measured for all the particles excluding those particles which are hidden by other particles and are uncalculatable.

The large number of crystal grains contain primary particles of non-octahedral shape by 70 areal % or more, more preferably by 80 to 98 areal %, particularly preferably by 85 to 95 areal %. When the proportion of the primary particles of non-octahedral shape contained in the large number of crystal grains is less than 70 areal %, there may be a reduction in rate characteristics. Explanation is made below on the method for measurement of the proportion of the primary particles of non-octahedral shape contained in the large number of crystal grains.

First, explanation is made on "primary particles of non-octahedral shape". As shown in FIG. 5A to FIG. 5F, the primary particles of octahedral shape include not only primary particles 31 of octahedral shape but also partly chipped primary particles 32 and primary particles 33 having ridge lines. Meanwhile, as shown in FIG. 6A to FIG. 6G, the primary particles of non-octahedral shape include not only primary particles 34 clearly not having an octahedral shape, but also apex-chipped primary particles 35, primary particles 36 in which rectangular faces are observed, and roundish primary particles 37. Here, as to the apex-chipped primary particles 35 and the primary particles 36 in which rectangular faces are observed, an apex is confirmed according to the following method and, when the apex has been confirmed, such primary particles are regarded to belong to primary particles of octahedral shape.

First, the ridge lines (which can be seen in the four ridge-lines constituting an apex) are extended to draw an imaginary apex (as necessary, new ridge lines are added). Next, the longest ridge line is selected of the ridge lines (excluding the newly added imaginary ridge lines). Lastly, for the longest ridge line, when the length of the imaginary ridge line is one fifth or smaller as compared with the length of the actual ridge line, the virtual apex is considered as apex.

Next, explanation is made on the method for measurement of "the proportion of the primary particles of non-octahedral shape contained in the large number of crystal grains". The area (A) occupied by all the crystal grains whose particle diameters and shapes can be evaluated, and the area (b) occupied by the primary particles of non-octahedral shape and having particle diameters of 5 to 20 µm are measured using an image edit software (Photoshop (trade name), a product of Adobe Systems Incorporated); they are substituted into an expression $[(b/A) \times 100]$; thereby, the proportion can be calculated.

The large number of crystal grains contained in the positive electrode active material of the present invention preferably contain single particles by 40 areal % or more. That is, the proportion of the single particles contained in the large number of crystal grains is preferably 40 areal % or more. When the proportion of the single crystals is less than 40 areal %, the amount of secondary particles such as polycrystal particles, agglomerated particles and the like is relatively large; thereby, the diffusion of Li ion is hindered at the particle boundary parts of secondary particles, which may cause a reduction in rate characteristics. Incidentally, in the present Specification, "single particle" refers to a crystal grain present independently, of the crystal grains contained in the large number of crystal grains; that is, a crystal grain not forming a polycrystalline particle or an agglomerated particle.

The proportion (areal %) of the single particles contained in the large number of crystal grains can be determined by the following method. A positive electrode active material is mixed with a conductive resin ("Technovit 5000" (trade name), a product of Heraeus Kulzer GmbH), followed by curing. Then, the cured material is subjected to mechanical grinding and then ion-polished using a cross section polisher ("SM-09010" (trade name), a product of JEOL Ltd.). The backscattered electron image of the ion-polished material is taken, using a scanning electron microscope ("ULTRA 55" (trade name), a product of Carl Zeiss, Inc.), and the cross section of the positive electrode active material is observed.

In the backscattered electron image, the contrast differs owing to channeling effect when the crystallographic direction differs. Therefore, when a particle boundary part is present in the crystal grain being observed, the particle boundary part becomes clear or unclear by slightly changing the direction of observation of sample (the inclination of sample). Utilizing this phenomenon, the presence of particle boundary part can be confirmed; thereby, there can be identified whether or not a crystal grain is a single particle, or a polycrystalline particle formed by connection of primary particles of different crystal directions or an agglomerated particle.

Figure 7A:
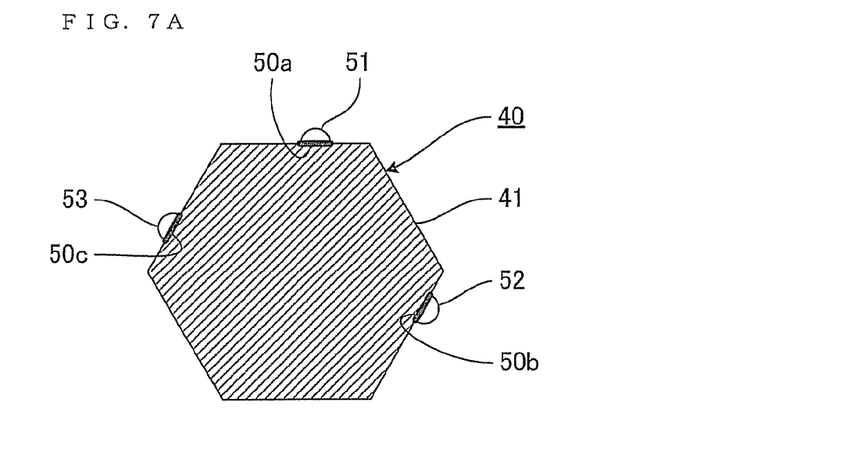
FIG. 7A is a schematic drawing showing a state in which crystal grains adhere to each other in a cross-section of the positive electrode active material of the present invention.

There is a case in which microparticles (crystal grains) significantly smaller in diameter (e.g. about 0.1 to 1 μm) than the particle diameter of single particle adhere onto the surface of a crystal grain (see FIG. 7A). Also, there is a case in which polycrystalline particles or agglomerated particles adhere onto each other at a small part (see FIG. 7B). In such cases, the parts (adhesion arts 50a to 50c in FIG. 7A) at which microparticles 51 to 53 adhere onto the surface of a crystal grain 41, and the part (adhesion part 50d in FIG. 7B) at which crystal grains 42 and 43 are in contact with each other, are slight; therefore, there is no influence on rate characteristics and durability. Accordingly, such crystal grains can be regarded substantially as single particle. Specifically explaining, when the length of adhesion part (the total of all adhesion parts when there is a plurality of adhesion parts) of a crystal grain is ⅕ or smaller relative to the circumference of the crystal grain estimated from the backscattered electron image by using an image edit software ("Image-Pro" (trade name), a product of Media Cybernetics, Inc.), the crystal grain is regarded as single particle and is counted.

Figure 7B:
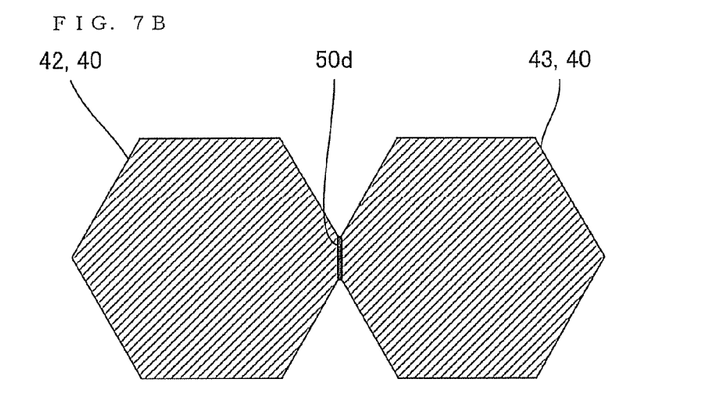
FIG. 7B is a schematic drawing showing a state in which crystal grains adhere to each other in a cross-section of the positive electrode active material of the present invention.
Figure 7C:
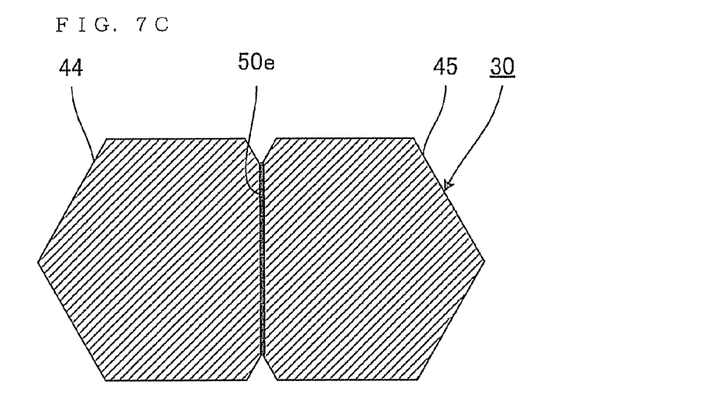
FIG. 7C is a schematic drawing showing a state in which crystal grains adhere to each other in a cross-section of the positive electrode active material of the present invention.
Figure 7D:
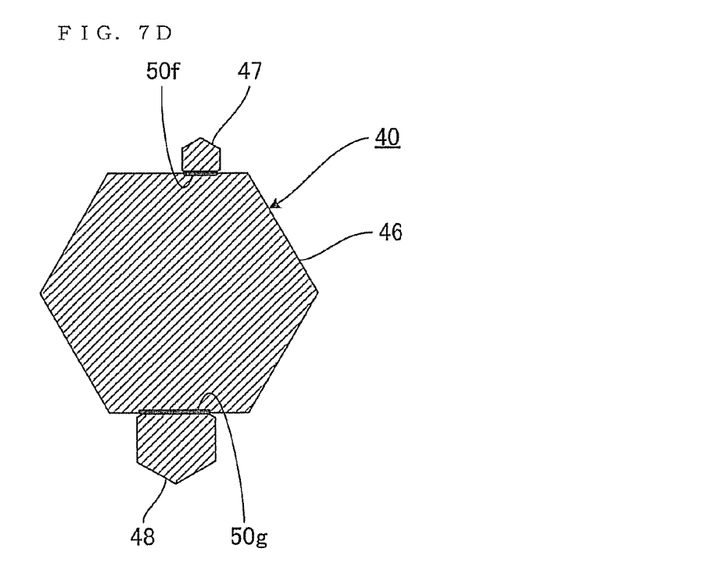
FIG. 7D is a schematic drawing showing a state in which crystal grains adhere to each other in a cross-section of the positive electrode active material of the present invention.

FIG. 7A to 7D are each a schematic drawing showing a state in which crystal grains adhere to each other, in the cross-section of the positive electrode active material of the present invention. For example, FIG. 7A is a case in which three microparticles 51 to 53 adhere onto the surface of a crystal grain 41 and the total of the lengths of adhesion parts 50a to 50c is ⅕ or smaller relative to the circumference of the crystal grain 41. In this case, the crystal grain 41 is regarded as single particle. Meanwhile, any of the microparticles 51 to 53 is not regarded as single particle because the length of each adhesion part is ⅕ or larger relative to the circumference of each microparticle. FIG. 7B is a case in which crystal grains 42 and 43 adhere to each other and the length of adhesion part 50d is ⅕ or smaller relative to the circumference of the crystal grain 42 or 43. In this case, the crystal grains 42 and 43 are each regarded as single particle. FIG. 7C is a case in which crystal grains 44 and 45 adhere to each other and the length of adhesion part 50e is ⅕ or larger relative to the circumference of the crystal grain 44 or 45. In this case, any of the crystal grains 44 and 45 is not regarded as single particle. FIG. 7D is a case in which two small crystal grains 47 and 48 (not microparticles) adhere onto the surface of a crystal grain 46 and the total of the lengths of adhesion parts 50f and 50g is ⅕ or smaller relative to the length of the circumference of the crystal grain 46. In this case, the crystal grain 46 is regarded as single particle. Meanwhile, any of the crystal grains 47 and 48 is not regarded as single particle because the length of each adhesion part is ⅕ or larger relative to the circumference of the crystal grain 47 or 48.

In this way, there is judged whether or not each crystal grain is a single particle. The proportion (areal %) of single particles can be calculated by measuring the area (C) occupied by all crystal grains whose areas can be measured from the backscattered electron image and the area (c) occupied by all single particles by using the above-mentioned image edit software and substituting them into an expression (c/C)×100.

Figure 1:
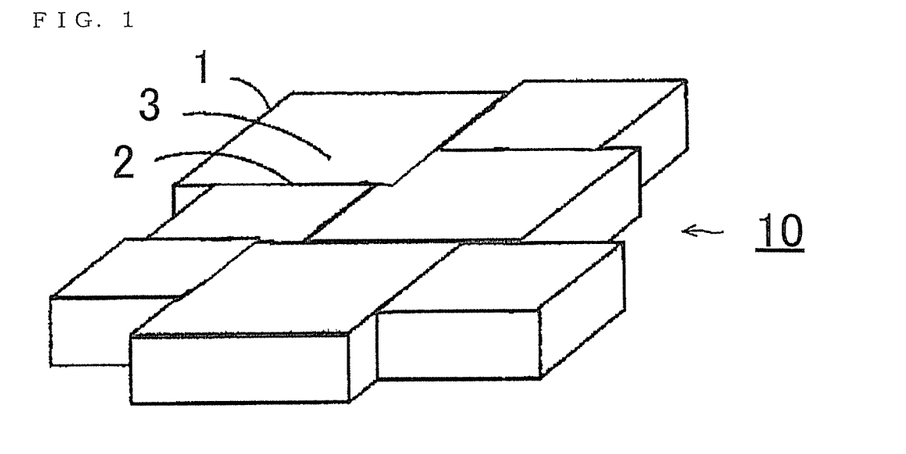
FIG. 1 is a perspective view showing an example of the state in which a plurality of primary particles are connected to each other.
Figure 2:
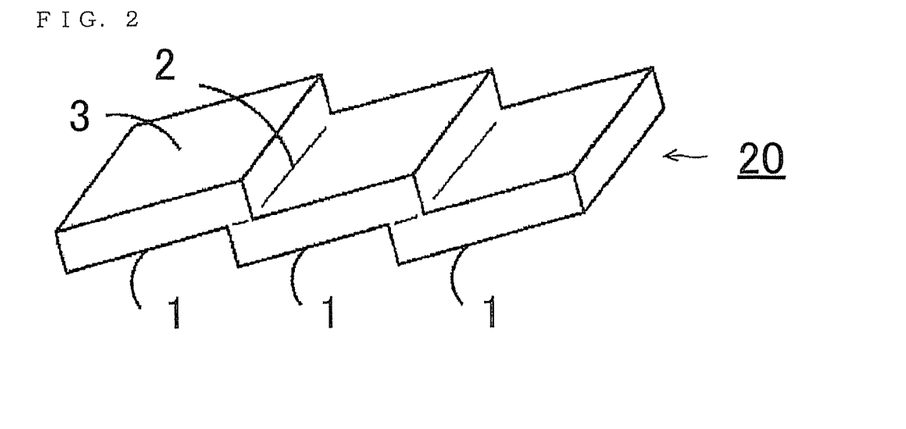
FIG. 2 is a perspective view showing another example of the state in which a plurality of primary particles are connected to each other.

The large number of crystal grains preferably contain secondary particles formed by mutual connection of a plurality of primary particles. Each secondary particle is formed by mutual connection of a plurality of primary particles. FIG. 1 is a perspective view showing an example of the state in which a plurality of primary particles are connected to each other. FIG. 2 is a perspective view showing other example of the state in which a plurality of primary particles are connected to each other. As shown in FIG. 1, in a secondary particle 10, a plurality of primary particles 1 are connected to each other at their particle boundary parts 2. In FIG. 1, a plurality of primary particles 1 are connected to each other so that one crystal face 3 of each primary particle is on one same plane. Incidentally, the secondary particles are not restricted to those formed by the above connection and may be, for example, those formed by such mutual connection that a plurality of primary particles 1 are piled up in such a way that one crystal face 3 of each primary particle 1 is directed to one same direction, as shown in FIG. 2. Of these secondary particles, preferred are those formed by in-plane connection of a plurality of primary particles 1, such as shown in FIG. 1., because such connection provides the following advantages. That is, in the FIG. 1 connection, there is no particle boundary part (which inhibits the diffusion of Li) in the thickness direction of each primary particle 1; therefore, there can be maintained about the same charge-discharge property as when there is used a positive electrode active material containing a large number of single particles free from secondary particles; meanwhile, there is obtained a smaller specific surface area than in the large number of single particles free from secondary particles, resulting in the higher durability (higher cycle characteristics) of positive electrode active material.

When the secondary particles are formed by in-plane connection of primary particles, it is preferable that 2 to 20 primary particles having particle diameters of 5 to 20 μm are connected. When the number of connection of primary particles is larger than 20, the secondary particles has a flat shape of large aspect ratio; when filling is made so that the flat face is parallel to the surface of positive electrode plate, the diffusion distance of Li ion into the thickness direction of positive electrode plate becomes long and a reduction in rate characteristics is incurred, which is not preferred.

(Production Method)

As to the production method of the positive electrode active material of the present invention, there is no particular restriction, and there is the following method, for example. First, there is prepared a mixed powder containing a lithium compound and a manganese compound.

As the lithium compound, there can be mentioned, for example, $Li_2CO_3$, $LiNO_3$, $LiOH$, $Li_2O_2$, $Li_2O$ and $CH_3COOLi$. As the manganese compound, there can be mentioned, for example, $MnO_2$, $MnO$, $Mn_2O_3$, $Mn_3O_4$, $MnCO_3$ and $MnOOH$. When Mn is substituted by a substituting element other than Li, the mixed powder may contain an aluminum compound, a magnesium compound, a nickel compound, a cobalt compound, a titanium compound, a zirconium compound, a cerium compound, etc. As the aluminum compound, there can be mentioned, for example, $\alpha\text{-}Al_2O_3$, $\gamma\text{-}Al_2O_3$, $AlOOH$ and $Al(OH)_3$. As the magnesium compound, there can be mentioned, for example, $MgO$, $Mg(OH)_2$ and $MgCO_3$. As the nickel compound, there can be mentioned, for example, $NiO$, $Ni(OH)_2$, and $NiNO_3$. As the cobalt compound, there can be mentioned, for example, $CO_3O_4$, $CoO$ and $Co(OH)_3$. As the titanium compound, there can be mentioned, for example, $TiO$, $TiO_2$ and $Ti_2O_3$. As the zirconium compound, there can be mentioned, for example, $ZrO_2$, $Zr(OH)_4$ and $ZrO(NO_3)_2$. As the cerium compound, there can be mentioned, for example, $CeO_2$, $Ce(OH)_4$ and $Ce(NO_3)_3$.

Incidentally, the mixed powder may further contain a grain growth-promoting agent as necessary. As the grain growth-promoting agent, there can be mentioned, for example, a flux agent such as NaCl, KCl or the like and a low-melting agent such as $Bi_2O_3$, PbO, $Sb_2O_3$, glass or the like. Of these, $Bi_2O_3$ is preferred. Also, the mixed powder may contain, for promotion of grain growth, a seed crystal composed of lithium manganate of spinel structure, as a nucleus of grain growth. Further, the seed crystal and the grain growth-promoting agent may be added together. In this case, the grain growth-promoting agent may be added in a state that it is adhered to the seed crystal.

The mixed powder may be ground as necessary. The particle diameter of the mixed powder is preferably 10 μm or smaller. When the particle diameter of the mixed powder is larger than 10 μm, the mixed powder may be subjected to dry or wet grinding to make the particle diameter 10 μm or smaller. There is no particular restriction as to the method for grinding, and the grinding can be conducted using, for example, a pot mill, a beads mill, a hammer mill or a jet mill.

Next, the mixed powder prepared is formed into a sheet shape, to produce a formed article. There is no particular restriction as to the shape of the formed article, and there can be mentioned, for example, a sheet shape, a granular shape, a hollow-granule shape, a flake shape, a honeycomb shape, a bar shape and a roll shape (a wound shape). In order to more effectively obtain primary particles which have particle diameters of 5 to 20 μm and a non-octahedral shape, the formed article can be produced as, for example, a sheet-shaped formed article of 10 to 30 μm in thickness, a hollow-granular-shaped formed article having a shell thickness of 10 to 30 μm, a grain-shaped formed article of 10 to 30 μm in diameter, a flake-shaped formed article of 10 to 30 μm in thickness and 50 μm to 10 mm in size, a honeycomb-shaped formed article of 10 to 30 μm in partition wall thickness, a roll-shaped (wound) formed article of 10 to 30 μm in thickness, and a bar-shaped formed article of 10 to 30 μm in diameter. Of these, a sheet-shaped formed article of 10 to 30 μm in thickness is preferred.

The method for forming a sheet-shaped or flake-shaped formed article is not particularly restricted and the forming can be conducted, for example, by a doctor blade method, by a drum drier method in which a slurry of a mixed powder is coated on a hot drum and dried and then the dried material is scraped off using a scraper, by a disc drier method in which a slurry of a mixed powder is coated on a hot disc area and dried and then the dried material is scraped off using a scraper, or by an extrusion molding method in which a clay containing a mixed powder is extruded through a die with slits. Of these forming methods, there is preferred a doctor blade method capable of forming a uniform sheet-shaped formed article. The density of the shaped formed article obtained by the above forming method may be increased by pressing using a roller or the like. A hollow-shaped formed article can be produced by appropriately setting the conditions of spray dryer. As the method for producing a grain-shaped formed article (a bulk shaped formed article) of 10 to 30 μm in diameter, there can be mentioned, for example, a spray dry method, a method, of pressing a mixed powder by a roller or the like, and a method of cutting an extrudate which is a bar-shaped or sheet-shaped formed article. As the method for producing a honeycomb-shaped or bar-shaped formed article, there can be mentioned, for example, an extrusion molding method. Also, as the method for producing a roll-shaped formed article, there can be mentioned, for example, a drum dryer method.

Then, the formed article obtained is fired to obtain a sintered article. There is no particular restriction as to the method for firing. The firing of the sheet-shaped formed article is preferably conducted by placing each sheet on a setter one by one so as to minimize the piling-up of sheets, or by placing crumpled sheets in a cover-opened sagger. As the specific firing condition, there can be mentioned a condition in which firing is conducted in an oxidizing atmosphere at about 830 to 1,050° C. for 5 to 50 hours. Here, the oxidizing atmosphere refers generally to an atmosphere having such an oxygen partial pressure that the mixed powder can give rise to an oxidation reaction, and specifically to an air atmosphere, an oxygen atmosphere or the like. The oxygen partial pressure in the oxidizing atmosphere is preferably as high as possible and, for example, 50% or higher relative to the pressure of the atmosphere. Incidentally, a grain growth-promoting agent (e.g. bismuth oxide) may be added in the firing.

By conducting the firing with a controlled temperature elevation rate, the particle diameter of primary particles after firing can be uniformized. In this case, the temperature elevation rate may be, for example, 50 to 500° C. per hour. Also, by keeping the temperature in a low temperature range and then conducting the firing at the firing temperature, it is possible to grow primary particles uniformly. In this case, the low temperature range may be 400 to 800° C. when the formed article is fired, for example, at 900° C. The uniform growth of primary particles is also possible by forming crystal nuclei at a temperature higher than the firing temperature and then conducting the firing at a firing temperature. In this case, the temperature higher than the firing temperature may be 1,000° C., for example, when the firing temperature of the firing material is 900° C.

The firing can also be conducted in two stages. For example, a mixed powder of manganese oxide and alumina is formed into a sheet shape, the shaped formed article is fired, a lithium compound is added thereto, and firing is conducted again, whereby lithium manganate can be produced. Also, lithium manganate crystal of high lithium content is produced, then manganese oxide or alumina is added, and firing is conducted again, whereby lithium manganate can be produced.

It is presumed that the presence of a grain growth-promoting agent and the above-mentioned seed crystal in firing promotes the grain growth of primary particles even at relatively low temperatures (e.g. about 900° C.) and is effective for achieving a small specific surface area as well as high crystallinity. By thus conducting the firing, there can be prepared lithium manganate of spinel structure as a polycrystal composed of primary particles of relatively large particle diameters and high crystallinity. Incidentally, in the firing of a sheet-shaped, hollow-granular-shaped, flake-shaped, honeycomb-shaped, bar-shaped, or roll-shaped formed article, by conducting the grain growth sufficiently until the particles become singleness in the thickness direction of sheet or the like, there can be prepared a sintered article in which primary particles (whose particle diameters are restricted by the thickness of sheet or the like and are uniform) are connected in a plane. Further, in this case, the grain growth in the thickness direction of sheet or the like is restricted; grain growth in two-dimensional direction is promoted; as a result, a non-octahedral shape is easily formed, which is preferable. Furthermore, neighboring primary particles are connected closely to each other two-dimensionally and, when disintegration is conducted at particle boundary parts to obtain primary particles, the interfaces (the particle boundary parts) are exposed; as a result, a non-octahedral shape is easily formed, which is preferable. Also, in the firing of a bulk shaped formed article, the growth of primary particles is restricted by the diameters (10 to 30 µm) of bulk shaped formed article; therefore, a non-octahedral shape is easily formed. By the above operation, there can be formed a large number of crystal grains containing primary particles of non-octahedral shape by 70 areal % or more.

Next, the sintered article prepared is ground. As the method for grinding, there is no particular restriction. There can be mentioned, for example, a method of disintegrating the sintered article by pressing it against a mesh or a screen of 10 to 100 µm in opening diameter, and a method of disintegrating the sintered article by using a ball mill, a vibration mill, a jet mill, a hammer mill, a pin mill, a pulverizer, an air-current grinder or the like. In the case of the sheet-shaped sintered article in which primary particles are connected to each other in a plane, the grinding can be conducted in such an extent that particle boundary parts break away with no breakage of primary particles, by setting the grinding method and conditions appropriately. As a result, primary particles uniform in particle diameter can be obtained easily and the energy needed in grinding is small, resulting in little formation of defects including lattice strain, which is preferable.

After the grinding, the primary particles non-uniform in particle diameters are subjected to wet or dry classification, whereby crystal grains having intended particle diameters and an intended proportion of single particles can be obtained. As to the method for classification, there is no particular restriction, but there can be mentioned, for example, a method of conducting sieving using a mesh of 5 to 100 µm in opening diameter, a method by water elutriation, and a method of using an air classifier, a sieve classifier, an elbow jet classifier or the like.

The obtained primary particles having intended particle diameters are subjected to a re-heating treatment at 600 to 700° C. under an oxidizing atmosphere, whereby oxygen defect is cured and there can be produced a positive electrode active material containing a large number of crystal grains containing a plurality of single particles and secondary particles formed by mutual connection of primary particles. The re-heating treatment may also be conducted before the grinding, that is, during the temperature lowering in the first firing, by maintaining the sintered article at a desired temperature for a given period of time, and this is effective for the recovery from oxygen defect. In this case, when there is used a sheet-shaped sintered article in which primary particles are connected to each other in a plane, as compared with when there is used a sintered material in which primary particles are connected to each other three-dimensionally, the diffusion distance of oxygen is short and oxygen defect can be cured in a short time, which is preferable. When the reheating step is conducted after the grinding (or after the classification), the powder after reheating may be subjected again to grinding and classification. The grinding and the classification can be conducted by the above-mentioned methods, etc.

The positive electrode active material of the present invention can be produced by the above-mentioned method. According to such a production method, there can be obtained a positive electrode active material which comprises a large number of crystal grains containing, by 70 areal % or more, primary particles of non-octahedral shape, having particle diameters of 5 to 20 µm.

(Physical Properties)

The value of a lattice strain ($\eta$) in powder X-ray diffraction pattern of the positive electrode active material is preferably $0.05 \times 10^{-3}$ to $0.7 \times 10^{-3}$, more preferably $0.05 \times 10^{-3}$ to $0.5 \times 10^{-3}$, particularly preferably $0.05 \times 10^{-3}$ to $0.3 \times 10^{-3}$. When the value of the lattice strain ($\eta$) is not within this range, there may be a reduction in rate characteristics. Incidentally, the value of the lattice strain ($\eta$) can be calculated using the following numerical expression (2).

$$\beta \cos \theta = \lambda/D + 2\eta \sin \theta \quad (2)$$

[In the numerical expression (2), $\beta$ indicates a integral integrated full width at half maximum (rad); $\theta$ indicates a diffraction angle) (°); $\lambda$ indicates a wavelength (Å) of X-ray; and D indicates a crystallite size (Å).]

More specifically, the value of the lattice strain ($\eta$) can be calculated by analyzing the diffraction image of powder X-ray diffraction pattern using an analytical software "TOPAS", according to the WPPD (Whole Powder Pattern Decomposition) method. Incidentally, the powder X-ray diffraction pattern can be measured using, for example, "D8 ADVANCE" (a product of Bruker AXS, Inc.).

A specific surface area of the positive electrode active material is preferably 0.1 to 0.5 m²/g, more preferably 0.15 to 0.4 m²/g, particularly preferably 0.2 to 0.35 m²/g. When the specific surface area of the positive electrode active material is not in this range, there may be a reduction, in cycle characteristics. Incidentally, the specific surface area can be measured using "Flowsorb III 2305" (trade name) (a product of Shimadzu Corporation), by using nitrogen as an adsorption gas.

II. Lithium Secondary Battery

The lithium secondary battery of the present invention has an electrode body which comprises a positive electrode containing the positive electrode active material described in "I. Positive electrode active material" and a negative electrode containing a negative electrode active material. The lithium secondary battery of the present invention is superior in high-temperature cycle characteristics. Such a characteristics appears strikingly particularly in large-capacity secondary batteries produced using a large amount of an electrode active material. Therefore, the lithium secondary battery of the present invention can be used preferably, for example, as a motor driven electric source of electric vehicle or hybrid electric vehicle. However, the lithium secondary battery of the present invention can also be used preferably as a small-capacity cell (e.g. coin cell).

The positive electrode can be obtained, for example, by mixing a positive electrode active material with acetylene black (a conductive agent), polyvinylidene fluoride (PVDF) (a binder), polytetrafluoroethylene (PTFE), etc. at given proportions to prepare a positive electrode material and coating the positive electrode material on the surface of metal foil or the like. As the positive electrode active material, there may be used lithium manganate of spinel structure alone, or a mixture thereof with a different active material (e.g. lithium nickelate, lithium cobaltate, lithium cobalt-nickel-manganate (so-called ternary system), or lithium iron phosphate). Lithium nickelate consumes the hydrofluoric acid which generates in the electrolytic solution of battery and which causes the dissolution of manganese (the dissolution is the main cause of durability deterioration of lithium manganate), and suppresses the dissolution of manganese effectively.

As the materials (other than the positive electrode active material) required as the components of the lithium secondary battery of the present invention, there can be used various known materials. As the negative electrode active material, there can be used, for example, an amorphous carbonaceous material (e.g. soft carbon or hard carbon), highly graphitized carbon material (e.g. artificial graphite or natural graphite)

and acetylene black. Of these, a highly graphitized carbon material (which is high in lithium capacity) is used preferably. Using such a negative electrode active material, a negative electrode material is prepared; the negative electrode material is coated on a metal foil or the like; thereby, a negative electrode is obtained.

As the organic solvent used in the non-aqueous electrolytic solution, there can be preferably used a carbonic acid ester type solvent (e.g. ethylene carbonate (EC), diethyl carbonate (DEC), dimethyl carbonate (DMC) or propylene carbonate (PC)), a single solvent (e.g. γ-butyrolactone, tetrahydrofuran, acetonitrile or the like), or a mixed solvent thereof.

As specific examples of the electrolyte, there can be mentioned a lithium complex fluoride compound (e.g. lithium phosphate hexafluoride ($LiPF_6$) or lithium borofluoride ($LiBF_4$)) and a lithium halide (e.g. lithium perchlorate ($LiClO_4$)). Ordinarily, at least one kind of such electrolyte is used by being dissolved in the above-mentioned organic solvent. Of these electrolytes, $LiPF_6$ is used preferably because it hardly causes oxidative decomposition and gives a high conductivity in non-aqueous electrolytic solution.

Figure 3:
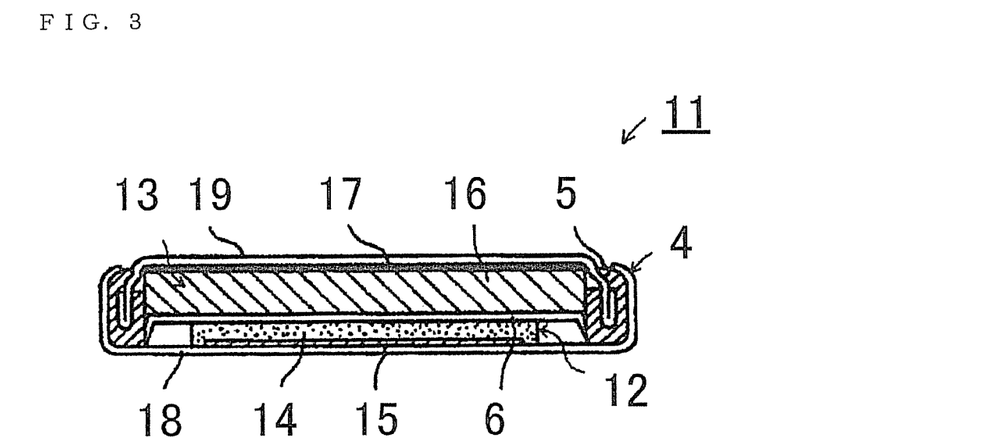
FIG. 3 is a sectional view showing an embodiment of the lithium secondary battery of the present invention.
Figure 4:
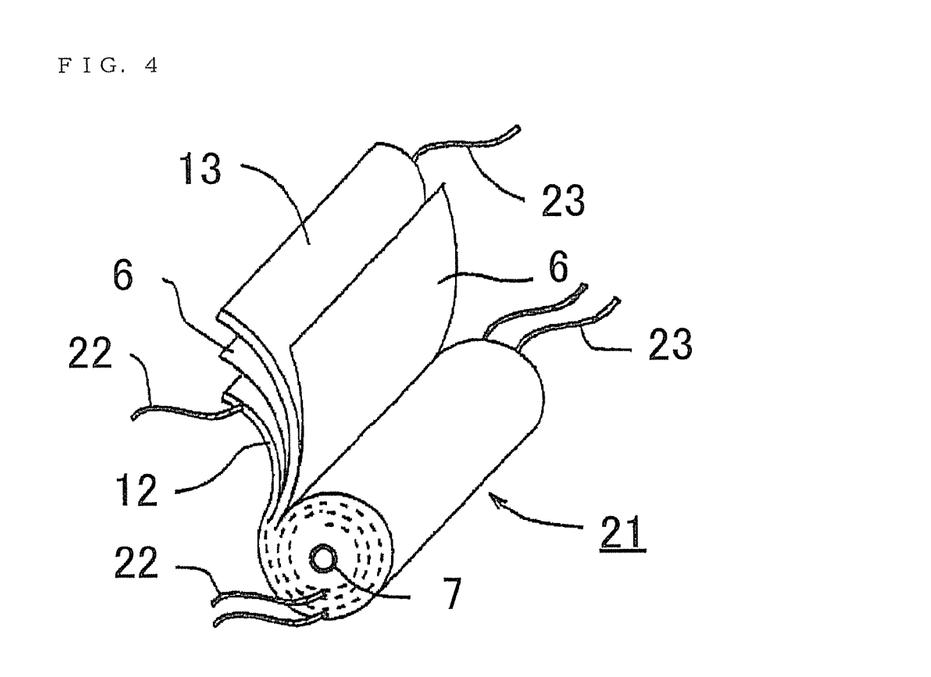
FIG. 4 is a schematic view showing an example of the electrode body constituting another embodiment of the lithium secondary battery of the present invention.
Figure 5A:
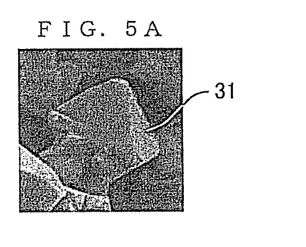
FIG. 5A is a electron micrograph showing an example of primary particles of octahedral shape.
Figure 5B:
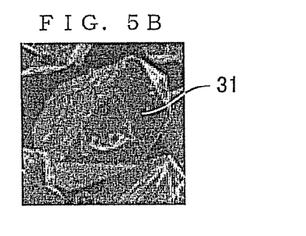
FIG. 5B is a electron micrograph showing another example of primary particles of octahedral shape.
Figure 5C:
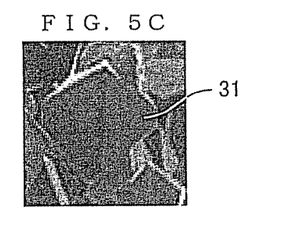
FIG. 5C is a electron micrograph showing still another example of primary particles of octahedral shape.
Figure 5D:
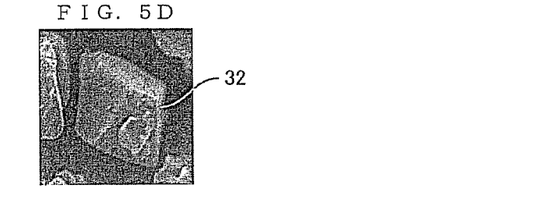
FIG. 5D is a electron micrograph showing still another example of primary particles of octahedral shape.
Figure 5E:
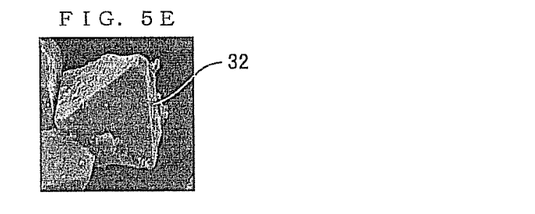
FIG. 5E is a electron micrograph showing still another example of primary particles of octahedral shape.
Figure 5F:
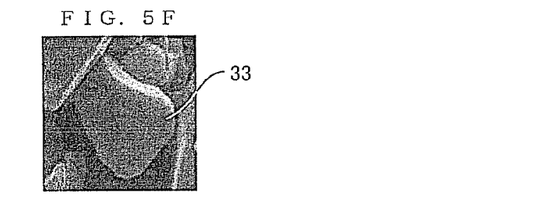
FIG. 5F is a electron micrograph showing still another example of primary particles of octahedral shape.
Figure 6A:
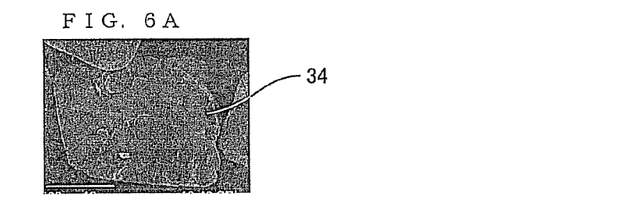
FIG. 6A is a electron micrograph showing an example of primary particles of non-octahedral shape.
Figure 6B:
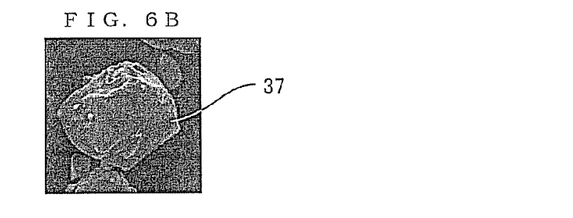
FIG. 6B is a electron micrograph showing another example of primary particles of non-octahedral shape.
Figure 6C:
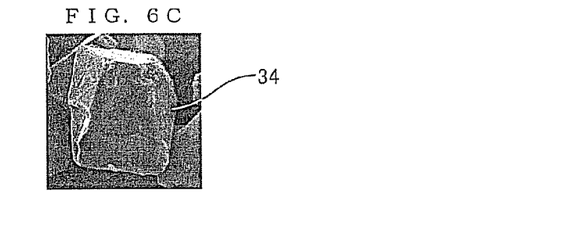
FIG. 6C is a electron micrograph showing still another example of primary particles of non-octahedral shape.
Figure 6D:
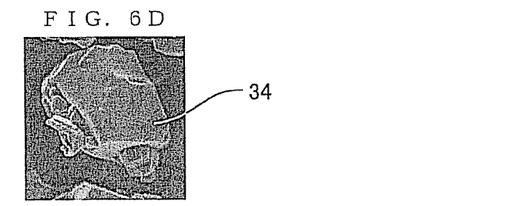
FIG. 6D is a electron micrograph showing still another example of primary particles of non-octahedral shape.
Figure 6E:
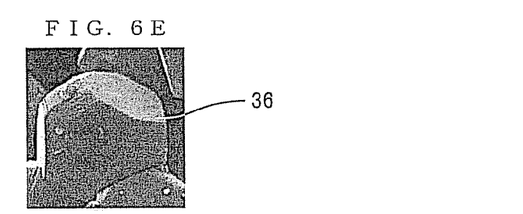
FIG. 6E is a electron micrograph showing still another example of primary particles of non-octahedral shape.
Figure 6F:
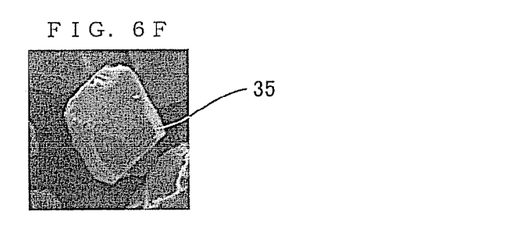
FIG. 6F is a electron micrograph showing still another example of primary particles of non-octahedral shape.
Figure 6G:
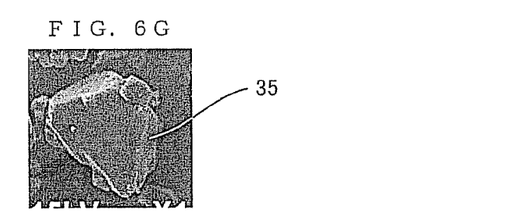
FIG. 6G is a electron micrograph showing still another example of primary particles of non-octahedral shape.

As specific examples of the battery structure, there can be mentioned a coin cell type lithium secondary battery (coin cell) 11 such as shown in FIG. 3, wherein an electrolytic solution is filled between a positive electrode plate 12 and a negative electrode plate 13 with a separator 6 provided between them; and a cylindrical lithium secondary battery such as shown in FIG. 4, using an electrode body 21 formed by winding or laminating, via a separator 6, a positive electrode plate 12 (prepared by coating a positive electrode active material on a metal foil) and a negative electrode 13 (prepared by coating a negative electrode active material on a metal foil).

EXAMPLES

The present invention is described specifically below by way of Examples. However, the present invention is in no way restricted to the following Examples. Incidentally, in the following Examples and Comparative Examples, "parts" are based on mass unless otherwise specified. The measurement methods of properties and the evaluation methods of properties are shown below.

[Proportion (Areal %) of Primary Particles of Non-Octahedral Shape]

The area (A) occupied by all the crystal grains and the area (b) occupied by the primary particles of non-octahedral shape and having particle diameters of 5 to 20 μm were measured using an image edit software (Photoshop (trade name), a product of Adobe Systems Incorporated); they were substituted into an expression ((b/A)×100); thereby, the proportion of the primary particles of non-octahedral shape was calculated.

[Proportion (Areal %) of Primary Particles Having Particle Diameters of 5 to 20 μm]

The area (A) occupied by all the crystal grains whose particle diameters could be measured and the area (a) occupied by the primary particles having particle diameters of 5 to 20 μm were measured using an image edit software (Photoshop (trade name), a product of Adobe Systems Incorporated); they were substituted into an expression (a/A)×100; thereby, the proportion of the primary particles having particle diameters of 5 to 20 μm was calculated. Incidentally, the particle diameters of the primary particles were measured as follows.

[Particle Diameters (μm) of Primary Particles]

A positive electrode active material powder was placed on a carbon tape so that there was no piling of particles; Au was sputtered thereon in a thickness of about 10 nm using an ion sputtering apparatus (JFC-1500 (trade name), a product of JEOL Ltd.); then, a secondary electron image of particles was taken, using a scanning electron microscope (JSM-6390 (trade name), a product of JEOL Ltd.), by selecting such a display magnification that 20 to 50 primary particles each having the maximum diameter of 5 μm or larger were in the visual field (the photographing conditions were accelerating voltage of 15 kV and working distance of 10 mm). For each primary particle in the image obtained, there was calculated an average of the maximum diameter of the particle part not hidden by other particles and the largest diameter of the diameters at right angle to the above maximum diameter, and the average was taken as the particle diameter (μm) of the primary particle. In this way, particle diameters were measured for all the primary particles excluding the particles hidden by other particles and uncalculatable.

[Value of a Lattice Strain (η)]

The powder X-ray diffraction pattern of a sample was obtained using "D8 ADVANCE" (a product of Bruker AXS, Inc.) under the following conditions and analyzed according to the WPPD method to calculate the value of the lattice strain of the sample.

X-ray output: 40 kV×40 mA
Goniometer radius: 250 mm
Divergence slit: 0.6°
Scattering slit: 0.6°
Receiving slit: 0.1 mm
Soller slit: 2.5° (incidence side, receiving side)
Measurement method: 2 θ/θ method in a Focusing optical geometry of horizontally-placed sample type (2 θ of 15 to 140° was measured, step width of 0.01°)
Scanning time Set so that the intensity of main peak ((111) face) became about 10,000 counts.

Incidentally, the specific analytical procedure is described below. The value of the lattice strain (η) obtained by other analytical procedure may be different from the value of the lattice strain (η) obtained by the present analytical procedure; however, these are not excluded from the scope of the present invention. In the present invention, the evaluation of the value of lattice strain should be made using the value of the lattice strain (η) obtained by the present analytical procedure.

1. Start of software (TOPAS) and load of measured data
2. Setting of emission profile (selection of Cu tube and Bragg-Brentano type focusing optical geometry)
3. Setting of background (Legendre polynominal is used as profile function, and the number of terms is set at 8 to 20.)
4. Setting of instrument (fundamental parameter is used, and slit conditions, filament length and sample length are input.)
5. Setting of corrections (sample displacement is used; absorption is also used when the packing density of sample in sample holder is low; in this case, absorption is set at the linear absorption coefficient of sample.)
6. Setting of crystal structure (space group is set at F−d3m; lattice constant, crystallite size and lattice strain are used; and the spread of profile by crystallite size and lattice strain is set as Lorenz function.)
7. Calculation (background, sample displacement, diffraction intensity, lattice constant, crystallite size and lattice strain are made precise.)
8. Analysis is over when the standard deviation of crystallite size is 6% or smaller of the crystallite size which has been made precise. When the standard deviation is larger than 6%, moves to the following procedure.

9. The spread of profile by lattice strain is set as Gauss function (the setting of the crystallite size as Lorenz function is unchanged.)
10. Calculation (background, sample displacement, diffraction intensity, lattice constant, crystallite size and lattice strain are made precise.)
11. Analysis is over when the standard deviation of crystallite size is 6% or smaller of the crystallite size which has been made precise. When the standard deviation is larger than 6%, analysis is impossible.
12. The lattice strain obtained is multiplied by n/180, and the value is taken as η.

[Specific Surface Area ($m^2/g$)]

Measured using "Flowsorb III 2305" (trade name) (a product of Shimadzu Corporation), by using nitrogen as an adsorption gas.

[Proportion (Areal %) of Single Particles]

A positive electrode active material was mixed with a conductive resin ("Technovit 5000" (trade name), a product of Heraeus Kulzer GmbH), followed by curing. Then, the cured material was subjected to mechanical grinding and then ion-polished using a cross section polisher ("SM-09010" (trade name), a product of JEOL Ltd.). The backscattered electron image of the ion-polished material was taken using a scanning electron microscope ("ULTRA 55" (trade name), a product of Carl Zeiss, Inc.) and the cross section of the positive electrode active material was observed.

In the backscattered electron image, the contrast differs owing to channeling effect when the crystallographic direction differs. Therefore, when a particle boundary part is present in the crystal grain being observed, the particle boundary part becomes clear or unclear by slightly changing the direction of observation of sample (the inclination of sample). Utilizing this phenomenon, the presence of particle boundary part can be confirmed; thereby, there can be identified whether or not a crystal grain is a single particle, or a polycrystalline particle formed by connection of primary particles of different crystal directions or an agglomerated particle.

There is a case in which microparticles (crystal grains) significantly smaller in diameter (e.g. about 0.1 to 1 μm) than the particle diameter of single particle adhere onto the surface of a crystal grain (see FIG. 7A). Also, there is a case in which polycrystalline particles or agglomerated particles adhere onto each other at a small part (see FIG. 7B). In such cases, the parts (adhesion arts $50a$ to $50c$ in FIG. 7A) at which microparticles 51 to 53 adhere onto the surface of a crystal grain 41, and the part (adhesion part $50d$ in FIG. 7B) at which crystal grains 42 and 43 are connected to each other, are slight; therefore, there is no influence on rate characteristics and durability. Accordingly, such crystal grains can be regarded substantially as single particle. Specifically explaining, when the length of adhesion part (the total of all adhesion points when there was a plurality of adhesion parts) of a crystal grain was ⅕ or smaller relative to the circumference of the crystal grain estimated from the backscattered electron image by using an image edit software ("Image-Pro" (trade name), a product of Media Cybernetics, Inc.), the crystal grain was regarded as single particle and was calculated.

In this way, there was judged whether or not each crystal grain was a single particle. The proportion (areal %) of single particles was calculated by measuring the area (C) occupied by all crystal grains whose areas could be measured from the backscattered electron image and the area (c) occupied by all single crystals, using the above-mentioned image edit software and substituting them into an expression (c/C)×100.

[Rate Characteristics (%)]

At a test temperature of 20° C., constant-current charge was conducted at a current of 0.1 C rate until the battery voltage became 4.3 V, and constant-voltage charge was conducted at a current condition of keeping the battery voltage at 4.3 V until the current decreased to ¹/₂₀. Then, a halt of 10 minutes was conducted. Subsequently, constant-current discharge was conducted at a current of 1C rate until the battery voltage became 3.0 V. Then, a halt of 10 minutes was conducted. This charge-discharge operation was taken as 1 cycle. Total 3 cycles were repeated at 20° C. A discharge capacity at the 3rd cycle was measured and taken as discharge capacity C(1C). Next, at a test temperature of 20° C., constant-current charge was conducted at a current of 0.1 C rate until the battery voltage became 4.3 V, and constant-voltage charge was conducted at a current condition of keeping the battery voltage at 4.3 V until the current decreased to ¹/₂₀. Then, a halt of 10 minutes was conducted. Subsequently, constant-current discharge was conducted at a current of 5C rate until the battery voltage became 3.0 V. Then, a halt of 10 minutes was conducted. This charge-discharge operation was taken as 1 cycle. Total 3 cycles were repeated at 20° C. A discharge capacity at the 3rd cycle was measured and taken as discharge capacity C(5C). The capacity retention rate (%) of the discharge capacity C(5C) at 5C rate to the discharge capacity C(1C) at 10 rate was calculated and taken as rate characteristics.

[Cycle Characteristics (%)]

At a test temperature of 60° C., charge was conducted at a constant current and constant voltage of 1C rate until the battery voltage became 4.3 V, and discharge was conducted at a constant current of 1C rate until the battery voltage became 3.0 V. This was taken as 1 cycle. 100 cycles of charge-discharge were repeated. Thereafter, the discharge capacity of the battery was divided by the initial capacity and the quotient (expressed in %) was taken as cycle characteristics.

Examples 1 to 8

Production of Positive Electrode Active Materials

Raw Material Preparation Step

There were weighed a $Li_2CO_3$ powder (a product of The Honjo Chemical Corporation, fine grade, average particle diameter: 3 μm), a $MnO_2$ powder (a product of Tosoh Corporation, electrolytic manganese dioxide, FM grade, average particle diameter: 5 μm, purity: 95%) (the two powders were weighed so as to give a chemical formula of $Li_{1.1}Mn_{1.9}O_4$), and a $Bi_2O_3$ powder (particle diameter: 0.3 μm, a product of Taiyo Koko Co., Ltd) (this powder was weighed so that the mass proportion (%) to $MnO_2$ became as shown in Table 1). Hundred parts of these powders and 100 parts of an organic solvent (as a dispersing medium) (a mixed solvent of equal volumes of toluene and isopropyl alcohol) were placed in a cylindrical, wide-mouthed bottle made of a synthetic resin and subjected to wet mixing and grinding for 16 hours with a ball mill containing zirconia balls of 5 mm in diameter, to obtain a mixed powder.

Sheet Formation Step

Ten parts of a polyvinyl butyral (as a binder) ("S-LEC BM-2" (trade name), a product of Sekisui Chemical Co., Ltd.), 4 parts of a plasticizer ("DOE" (trade name), a product of Kurogane Kasei Co., Ltd.) and 2 parts of a dispersing agent ("RHEODOL SP-O 30" (trade name), a product of Kao Corporation) were added to the mixed powder, followed by mixing, thereby a forming material of slurry state was obtained. The forming material of slurry state was degassed under vacuum with stirring, to adjust the slurry viscosity to 4,000 mPa·s. The viscosity-adjusted forming material of slurry state was spread on a PET film by doctor blade method, to obtain each sheet-shaped formed article. Incidentally, the thickness of each sheet-shaped formed article after drying is shown in Table 1.

Firing Step

The sheet-shaped formed article was peeled off from the PET film, cut into a 300 mm×300 mm size using a cutter, and placed in an alumina-made sagger (dimension: 90 mm×90 mm×60 mm (height)) in a crumpled state. Then, debinder was conducted at 600° C. for 2 hours in a cover-opened state (that is, under the air) or under an oxygen atmosphere, after that firing was conducted at a temperature shown in Table 1, for a time shown in Table 1.

Grinding Step

The sheet-shaped formed article after firing was placed on a polyester-made mesh having an average opening diameter of 20 μm and pressed lightly against the mesh using a spatula, for grinding. The resulting powder was dispersed in ethanol and subjected to an ultrasonic treatment (38 kHz, 5 minutes) using an ultrasonic cleaner. Then, the resulting material was passed through a 5 μm mesh in order to remove a fine powder of 5 μm or less, and then a powder remaining on the mesh was recovered.

Re-Heating Step

The powder after grinding was reheated under the air at 650° C. for 24 hours to produce a positive electrode active material. Incidentally, in Example 7, firing step and then re-heating step were conducted and thereafter grinding step was conducted.

Comparative Examples 1 and 2

Production of Positive Electrode Active Materials

Positive electrode active materials were produced in the same manner as in Examples 1 to 8 (excluding Example 7), which a mixed powder was obtained in a raw material preparation step by using ethanol as a dispersing medium and, after wet mixing and grinding, conducting drying using a rotary evaporator and this mixed powder was used in a firing step, except that the mixed powder was fired without being subjected to a sheet formation step.

In Table 1 are shown the addition amount of bismuth compound, thickness of sheet-shaped formed article after drying (excluding Comparative Examples 1 and 2), conditions of firing step, conditions of re-heating step, and properties of powder (positive electrode active material), in each of Examples 1 to 8, Comparative Examples 1 and 2.

TABLE 1

| | Formation step | | | Conditions of firing step | | | Conditions of re-heating step | | Properties of positive electrode active material | | | |
|---|---|---|---|---|---|---|---|---|---|---|---|---|
| | | Addition amount of Bi compound | | Thickness | Temp. | Time | | Timing (before or after grinding | Atmos- | Proportion of primary particles having particle diameters of 5 to 20 μm | Proportion of primary particles of non-octahedral shape | Value of a lattice strain (η) | Specific surface area |
| | Chemical formula | (mass %) | Form | (μm) | (° C.) | (h) | Atmosphere | step) | phere | (areal %) | (areal %) | (×10$^{-3}$) | (m$^2$/g) |
| Ex. 1 | Li$_{1.1}$Mn$_{1.9}$O$_4$ | 1 | Sheet | 12 | 900 | 36 | Air | After | Oxygen | 90 | 80 | 0.026 | 0.25 |
| Ex. 2 | Li$_{1.1}$Mn$_{1.9}$O$_4$ | 1 | Sheet | 15 | 900 | 24 | Air | After | Oxygen | 90 | 80 | 0.056 | 0.26 |
| Ex. 3 | Li$_{1.1}$Mn$_{1.9}$O$_4$ | 0.5 | Sheet | 10 | 900 | 12 | Air | After | Oxygen | 95 | 90 | 0.075 | 0.32 |
| Ex. 4 | Li$_{1.1}$Mn$_{1.9}$O$_4$ | 1 | Sheet | 17 | 900 | 12 | Air | After | Air | 98 | 95 | 0.269 | 0.18 |
| Ex. 5 | Li$_{1.1}$Mn$_{1.9}$O$_4$ | 0.5 | Sheet | 17 | 1000 | 12 | Oxygen | After | Air | 95 | 80 | 0.410 | 0.15 |
| Ex. 6 | Li$_{1.1}$Mn$_{1.9}$O$_4$ | 1 | Sheet | 17 | 1000 | 12 | Air | After | Air | 95 | 80 | 0.454 | 0.15 |
| Ex. 7 | Li$_{1.1}$Mn$_{1.9}$O$_4$ | 1 | Sheet | 17 | 900 | 12 | Air | Before | Air | 85 | 75 | 0.654 | 0.32 |
| Ex. 8 | Li$_{1.1}$Mn$_{1.9}$O$_4$ | 0 | Sheet | 12 | 1000 | 3 | Oxygen | After | Air | 90 | 70 | 0.785 | 0.24 |
| Comp. Ex. 1 | Li$_{1.1}$Mn$_{1.9}$O$_4$ | 1 | Powder | — | 1000 | 3 | Air | After | Air | 85 | 60 | 0.524 | 0.30 |
| Comp. Ex. 2 | Li$_{1.1}$Mn$_{1.9}$O$_4$ | 5 | Powder | — | 1000 | 3 | Air | After | Air | 85 | 45 | 0.465 | 0.28 |

Examples 9 to 16

Production of Positive Electrode Active Materials

Raw Material Preparation Step

There were weighed a Li$_2$CO$_3$ powder (a product of The Honjo Chemical Corporation, fine grade, average particle diameter: 3 μm), a MnO$_2$ powder (a product of Tosoh Corporation, electrolytic manganese dioxide, FM grade, average particle diameter: 5 μm, purity: 95%), an Al(OH)$_3$ powder (H-43M (trade name) (a product of Showa Denko K.K., average particle diameter: 0.8 μm) (these three powders were weighed so as to give a chemical formula of Li$_{1.08}$Mn$_{1.83}$Al$_{0.09}$O$_4$), and a Bi$_2$O$_3$ powder (particle diameter: 0.3 μm, a product of Taiyo Koko Co., Ltd) (this powder was weighed so that the mass proportion (%) to MnO$_2$ became as shown in Table 2). Hundred parts of these powders and 100 parts of an organic solvent (as a dispersing medium) (a mixed solvent of equal volumes of toluene and isopropyl alcohol) were placed in a cylindrical, wide-mouthed bottle made of a synthetic resin and subjected to wet mixing and grinding for 16 hours with a ball mill containing zirconia balls of 5 mm in diameter, to obtain a mixed powder.

Sheet formation step and re-heating step were conducted in the same manner as in Examples 1 to 8 to produce positive electrode active materials. Incidentally, in Example 15, as in Example 7, firing step and then re-heating step were conducted and thereafter grinding step was conducted.

Comparative Examples 3 to 4

Production of Positive Electrode Active Materials

Positive electrode active materials were produced in the same manner as in Comparative Examples 1 and 2 except that, in raw material preparation step, each mixed powder was obtained so as to give a chemical formula of Li$_{1.08}$Mn$_{1.83}$Al$_{0.09}$O$_4$.

In Table 2 are shown the addition amount of bismuth compound, thickness of sheet-shaped formed article after drying (excluding Comparative Examples 3 and 4), conditions of firing step, conditions of re-heating step, and properties of powder (positive electrode active material), in each of Examples 9 to 16 and Comparative Examples 3 and 4.

made of a Li plate, a negative electrode collector 17 made of a stainless steel plate, and a polyethylene film-made separator 6 having lithium ion permeability. By using each lithium secondary battery (coin cell) 11 produced, rate characteristics and cycle characteristics were evaluated. The evaluation results are shown in Table 3.

TABLE 2

| | | Formation step | | | Conditions of firing step | | | Conditions of re-heating step | | Properties of positive electrode active material | | | |
|---|---|---|---|---|---|---|---|---|---|---|---|---|---|
| | Chemical formula | Addition amount of Bi compound (mass %) | Form | Thickness (μm) | Temp. (°C.) | Time (h) | Atmosphere | Timing (before or after grinding step) | Atmosphere | Proportion of primary particles having particle diameters of 5 to 20 μm (areal %) | Proportion of primary particles of non-octahedral shape (areal %) | Value of a lattice strain (η) (×10⁻³) | Specific surface area (m²/g) |
| Ex. 9 | $Li_{1.08}Mn_{1.83}Al_{0.09}O_4$ | 1 | Sheet | 12 | 900 | 36 | Air | After | Oxygen | 90 | 80 | 0.027 | 0.22 |
| Ex. 10 | $Li_{1.08}Mn_{1.83}Al_{0.09}O_4$ | 1 | Sheet | 15 | 900 | 24 | Air | After | Oxygen | 95 | 80 | 0.059 | 0.24 |
| Ex. 11 | $Li_{1.08}Mn_{1.83}Al_{0.09}O_4$ | 0.5 | Sheet | 10 | 900 | 12 | Air | After | Oxygen | 90 | 85 | 0.080 | 0.31 |
| Ex. 12 | $Li_{1.08}Mn_{1.83}Al_{0.09}O_4$ | 1 | Sheet | 17 | 900 | 12 | Air | After | Air | 95 | 90 | 0.290 | 0.18 |
| Ex. 13 | $Li_{1.08}Mn_{1.83}Al_{0.09}O_4$ | 0.5 | Sheet | 17 | 1000 | 12 | Oxygen | After | Air | 95 | 85 | 0.440 | 0.16 |
| Ex. 14 | $Li_{1.08}Mn_{1.83}Al_{0.09}O_4$ | 1 | Sheet | 17 | 1000 | 12 | Air | After | Air | 90 | 80 | 0.510 | 0.19 |
| Ex. 15 | $Li_{1.08}Mn_{1.83}Al_{0.09}O_4$ | 1 | Sheet | 17 | 900 | 12 | Air | Before | Air | 90 | 75 | 0.676 | 0.33 |
| Ex. 16 | $Li_{1.08}Mn_{1.83}Al_{0.09}O_4$ | 0 | Sheet | 12 | 1000 | 3 | Oxygen | After | Air | 90 | 70 | 0.810 | 0.28 |
| Comp. Ex. 3 | $Li_{1.08}Mn_{1.83}Al_{0.09}O_4$ | 1 | Powder | — | 1000 | 3 | Air | After | Air | 90 | 55 | 0.495 | 0.28 |
| Comp. Ex. 4 | $Li_{1.08}Mn_{1.83}Al_{0.09}O_4$ | 5 | Powder | — | 1000 | 3 | Air | After | Air | 90 | 45 | 0.490 | 0.25 |

Examples 17 to 24, Comparative Examples 5 and 6

Production of Lithium Secondary Batteries

FIG. 3 is a sectional view showing an embodiment of the lithium secondary battery of the present invention. In FIG. 3, a lithium secondary battery (coin cell) 11 was produced by laminating a positive electrode collector 15, a positive electrode layer 14, a separator 6, a negative electrode layer 16 and a negative electrode collector 17 in this order, and encapsulating the resulting laminate and an electrolyte in a battery case 4 (containing a positive electrode side container 18, a negative electrode side container 19 and an insulation gasket 5) in liquid tight.

Specifically explaining, there were mixed 5 mg of each of the positive electrode active materials produced in Examples 1 to 8 and Comparative Examples 1 and 2, acetylene black (as a conductive agent) and a polytetrafluoroethylene (PTFE) (as a binder) at a mass ratio of 5:5:1, to produce each positive electrode material. The positive electrode material produced was placed on an Al mesh of 15 mm in diameter and press-molded into a disc using a press at a force of 10 kN, to produce each positive electrode layer 14.

Then, each lithium secondary battery (coin cell) 11 was produced using the above-produced positive electrode layer 14, an electrolytic solution prepared by dissolving $LiPF_6$ in an organic solvent consisting of equal volumes of ethylene carbonate (EC) and diethyl carbonate (DEC), so as to give a $LiPF_6$ concentration of 1 mol/L, a negative electrode layer 16

TABLE 3

| | Kind of positive electrode active material | Rate characteristics (%) | Cycle characteristics (%) |
|---|---|---|---|
| Example 17 | Example 1 | 92 | 94 |
| Example 18 | Example 2 | 99 | 98 |
| Example 19 | Example 3 | 99 | 97 |
| Example 20 | Example 4 | 98 | 96 |
| Example 21 | Example 5 | 96 | 96 |
| Example 22 | Example 6 | 96 | 95 |
| Example 23 | Example 7 | 95 | 95 |
| Example 24 | Example 8 | 92 | 94 |
| Comparative Example 5 | Comparative Example 1 | 87 | 96 |
| Comparative Example 6 | Comparative Example 2 | 84 | 97 |

The followings are clear from Table 3. By using a positive electrode active material containing primary particles of non-octahedral shape by 70 areal % or more, a lithium secondary battery superior in rate characteristics and cycle characteristics can be produced (Examples 17 to 24). Particularly when the value of the lattice strain (η) is within a range of $0.05 \times 10^{-3}$ to $0.7 \times 10^{-3}$, the rate characteristics and the cycle characteristics are particularly superior (Examples 18 to 23). Meanwhile, when there is used a positive electrode active material containing primary particles of non-octahedral shape by less than 70 areal %, the rate characteristics is low (Comparative Examples 5 and 6).

Examples 25 to 32, Comparative Examples 7 and 8

Production of Lithium Secondary Batteries

Lithium secondary batteries were produced in the same manner as in Examples 17 to 24 and Comparative Examples 5 and 6 except that there were used the positive electrode active materials produced in Examples 9 to 16 and Comparative Examples 3 and 4. By using each lithium secondary battery produced, rate characteristics and cycle characteristics were evaluated. The evaluation results are shown in Table 4.

TABLE 4

|  | Kind of positive electrode active material | Rate characteristics (%) | Cycle characteristics (%) |
| --- | --- | --- | --- |
| Example 25 | Example 9 | 91 | 96 |
| Example 26 | Example 10 | 98 | 98 |
| Example 27 | Example 11 | 98 | 98 |
| Example 28 | Example 12 | 96 | 97 |
| Example 29 | Example 13 | 95 | 97 |
| Example 30 | Example 14 | 95 | 97 |
| Example 31 | Example 15 | 93 | 96 |
| Example 32 | Example 16 | 90 | 96 |
| Comparative Example 7 | Comparative Example 3 | 86 | 98 |
| Comparative Example 8 | Comparative Example 4 | 84 | 98 |

The followings are clear from Table 4. By using a positive electrode active material containing primary particles of non-octahedral shape by 70 areal % or more, a lithium secondary battery superior in rate characteristics and cycle characteristics can be produced (Examples 25 to 32). Particularly when the value of the lattice strain (i) is within a range of $0.05 \times 10^{-3}$ to $0.7 \times 10^{-3}$, the rate characteristics and the cycle characteristics are particularly superior (Examples 26 to 31). Meanwhile, when there is used a positive electrode active material containing primary particles of non-octahedral shape by less than 70 areal %, the rate characteristics is low (Comparative Examples 7 and 8).

The positive electrode active material of the present invention allows production of a lithium secondary battery superior in high-temperature cycle characteristics. Therefore, its use in batteries for driving of hybrid electric vehicles, electric apparatuses, communication apparatuses, etc. can be expected.

The invention claimed is:

1. A positive electrode active material containing primary particles and secondary particles, said material containing, by 70 areal % or more, primary particles of non-octahedral shape, having particle diameters of 5 to 20 μm, and composed of lithium manganate of spinel structure containing lithium and manganese as the constituent elements,
    wherein the value of a lattice strain (η) in a powder X-ray diffraction pattern is $0.05 \times 10^{-3}$ to $0.7 \times 10^{-3}$, and
    wherein the primary particles are single particles by 40 areal % or more.

2. The positive electrode active material according to claim 1, wherein a specific surface area is 0.1 to 0.5 m²/g.

3. A lithium secondary battery which has an electrode body comprising a positive electrode containing a positive electrode active material according to claim 1 and a negative electrode containing a negative electrode active material.

4. A lithium secondary battery which has an electrode body comprising a positive electrode containing a positive electrode active material according to claim 2 and a negative electrode containing a negative electrode active material.

5. The positive electrode active material of claim 1, wherein the primary particles have particle diameters of 7 to 20 μm.

6. The positive electrode active material of claim 1, wherein the primary particles have particle diameters of 10 to 20 μm.

* * * * *